United States Patent

[11] 3,626,092

[72] Inventor Melvin G. Wilson
Rochester, Minn.
[21] Appl. No. 841,823
[22] Filed July 15, 1969
[45] Patented Dec. 7, 1971
[73] Assignee International Business Machines Corporation
Armonk, N.Y.

[54] VIDEO AMPLIFIER FOR OPTICAL SCANNERS
19 Claims, 3 Drawing Figs.
[52] U.S. Cl. .................................................. 178/7.1 R,
178/6.8 R, 178/7.2 R, 328/145, 328/161, 330/69
[51] Int. Cl. .................................................. H04n 5/38
[50] Field of Search .......................................... 178/7.1 R,
7.2 R, DIG. 16, 6.8 R, DIG. 3, 6 R; 328/145, 161;
307/229; 330/69

[56] References Cited
UNITED STATES PATENTS
3,037,129 5/1962 Lebel .......................... 328/145
3,058,057 10/1962 Frost .......................... 328/145
3,196,208 7/1965 Keiper ........................ 178/7.2
3,310,688 3/1967 Ditkofsky .................... 330/69
3,322,893 5/1967 Townsend .................... 178/7.1
3,379,826 4/1968 Gray .......................... 178/7.2

Primary Examiner—Richard Murray
Assistant Examiner—P. M. Pecori
Attorneys—Hanifin & Jancin and James Michael Anglin ABSTRACT: To correct for intensity variations in an optical scan generator, a first photodetector receives a light input directly from the generator, while a second photodetector receives light reflected from a document. A converter produces logarithmic representations of both photodetector outputs, and feeds them to a differential amplifier for subtraction. A video processor then produces a digitized video signal from the amplifier output. A low-frequency level control feeds the amplifier output back to its input to provide drift compensation by referencing the average background to a specified output level. The level control may be disabled by certain values of the digitized video signal.

PATENTED DEC 7 1971 3,626,092
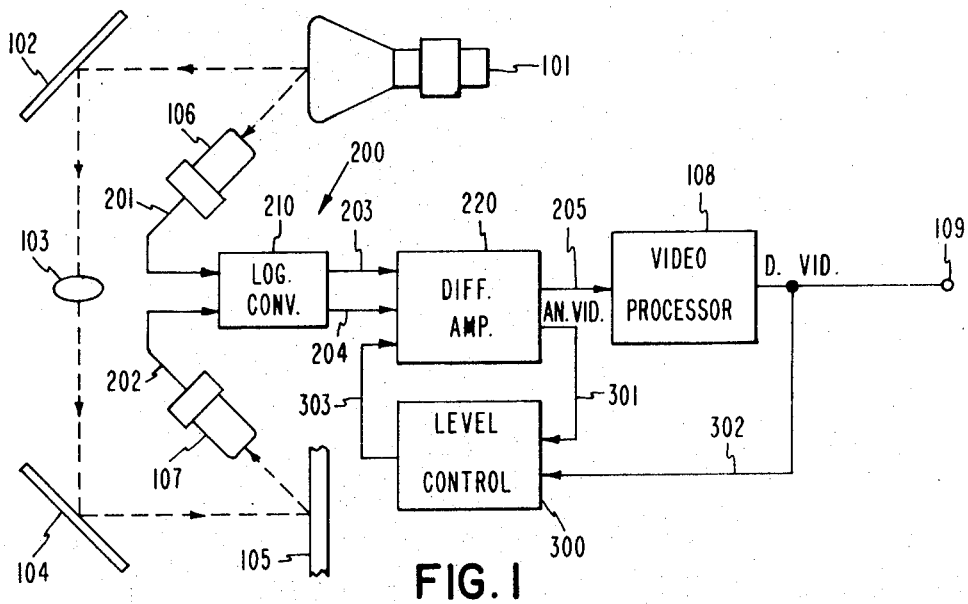
FIG. 1
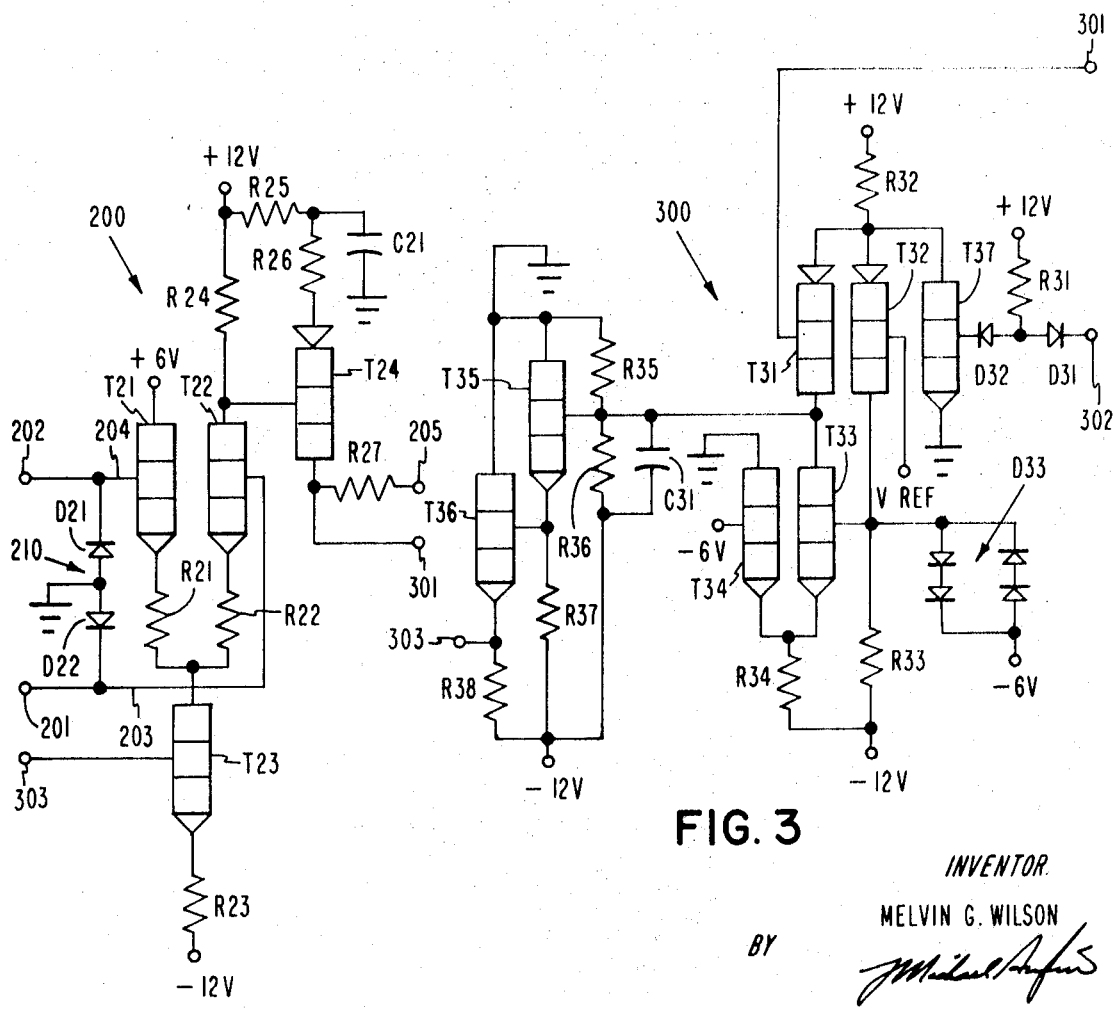
FIG. 2
FIG. 3
INVENTOR.
MELVIN G. WILSON
BY
ATTORNEY

VIDEO AMPLIFIER FOR OPTICAL SCANNERS

BACKGROUND OF THE INVENTION

In the field of optical scanning, as in many other fields of optical instrumentation and measurement, a beam of light is reflected from or transmitted through an object in order to determine the optical characteristics of the object. The accuracy of any such determination, however, is limited by the precision with which the applicable characteristics of the light source itself may be measured.

More particularly, optical character-recognition machines, mark readers and similar devices sense the presence of data on an object by sensing variations in the reflectance of the object. Since "reflectance" is defined as the ratio of the reflected to the incident light intensity, a knowledge of the light source intensity is required. An attractive solution to this problem, but one which is rarely achievable in practice, is to employ a light source having a constant intensity, either directly or by the use of feedback, and then to measure only the light reflected from the object. Cathode-ray tube (CRT) scan generators, for instance, have high-frequency variations due to small phosphor voids, low-frequency changes from electron-beam or phosphor nonuniformities, and drift caused by phosphor aging. Light-emitting diode (LED) arrays, in the present state of the art, may have intensity variations of 50 percent or more from unit to unit. Even laser scanners suffer from irregularity in light output.

Given the nonavailability of a constant-intensity light source, it has been proposed that the source intensity be continuously monitored and compared with the intensity of the reflected light by means of electronic analog-function devices. There are, however, problems with this approach also. Chief among these difficulties is unavoidable transfer-function variations inherent in presently available photodetectors and analog functional devices. The insurmountability of these problems has led the art away from this seemingly direct approach and into a number of substitute methods. Several conventional circuits, for instance, utilize the rate of change of reflected light intensity to provide a measure of reflectance variation. Other methods employ nonlinear amplification of the reflected-light signal alone, variable compensation circuits for source and object photodetectors, and subtractive comparison of source and document photodetectors, including nonlinear subtraction schemes. But the appearance of these various methods has not challenged the desirability of a direct, division-type reflectance function; only its practical attainability has been questioned.

SUMMARY OF THE INVENTION

Accordingly, it is a primary object of the present invention to advance the optical scanning and instrumentation art by providing a signal-handling apparatus which is capable of a direct, true and wideband reflectance determination for certain classes of video signals.

It is another object of the invention to provide such apparatus in a form which is simple and inexpensive to manufacture, and which does not require a large number of manual adjustments.

Briefly, it has been discovered that, where a reflected video signal has a predominant nominal value with brief excursions to other values, or where the signal has at least two levels which may be distinguished from each other in a digitized form, an electronic device for dividing two input signals may be stabilized against substantially all undesirable parameter variations. Such stabilization may be performed by a level-control device which follows the analog ratio or quotient signal and which feeds a signal derived therefrom back into an input of the division device. The derived signal may be a filtered version of the ratio signal; additionally, when a thresholding or digitizing unit is employed to discriminate between levels of the ratio signal, the operational mode of the level-control device may be set in accordance with various values of a discrete output therefrom.

Other features, objects and advantages of the present invention, as well as modifications obvious to those skilled in the applicable arts, will be appreciated from the following detailed description of a preferred embodiment thereof, taken in conjunction with the accompanying drawing.

BRIEF DESCRIPTION OF THE DRAWING

FIG. 1 is a block diagram of an optical scanner incorporating the invention.

FIG. 2 is a schematic diagram of the logarithmic converter and the differential amplifier of FIG. 1.

FIG. 3 is a schematic diagram of the level-control unit of FIG. 1.

DETAILED DESCRIPTION

FIG. 1 shows the invention in connection with an optical scanner of the flying-spot type employing a cathode-ray tube (CRT) 101 as a scan generator. The light beam from CRT 101 is transmitted through an optical system having a first mirror 102, a lens 103 and a second mirror 104 to an object or document 105 to be scanned. The arrangement shown is conventional and is for convenience only; any other scan generating and transmitting system will also be satisfactory. In order to detect the light intensities necessary for a reflectance measurement, a first photodetector, here shown as a photomultiplier tube (PMT) 106, is positioned to receive light directly from the face of CRT 101. PMT 106 then develops an electrical signal on line 201 which is proportional to the intensity of the light incident upon document 105. A second PMT 107 is directed so as to receive only that light which is reflected from document 105 and to provide a signal on line 202 which is proportional to the intensity of the reflected light.

The signals on lines 201 and 202 are then converted to respective logarithmic representations on lines 203 and 204 by a logarithmic converter 210. A differential amplifier 220 then subtracts the analog representation on line 203 from that on line 204 to provide an analog video output signal (at two different impedance levels, for specific circuit requirements) on lines 205 and 206.

Because of the logarithmic conversion of the input signals by unit 210 and the subtraction performed in unit 220, the analog output signal is proportional to the logarithm of the ratio of the two input signals. That is, the unit 210 and 220 together comprise an electronic division device yielding an output signal which is related to the quotient of two input signals. In some cases, it may be desirable that the output signal be directly proportional to the quotient of the input signals; conventional types of electronic antilogarithmic converters coupled to amplifier 220 will perform this function.

In most conventional character-recognition and mark-reading machines, a video processor compares the analog video signal to a threshold magnitude to provide a digitized video output. This digitized output is an essentially discontinuous or discrete signal having a first fixed value for a "white level" and a second fixed magnitude for a "black levle". Such a processor, variously known as a quantizing, thresholding, clipping or digitizing device, is useful in connection with the present invention, as shown by the reference numeral 108 in FIG. 1. The specific form of processor 108 is of no moment for the present purposes; representative examples of such units are shown in U.S. Pat. No. 3,339,178 to W. W. Hardin, U.S. Pat. No. 3,374,470 to W. S. Rohland and U.S. Pat. No. 3,415,950 to M. R. Bartz et al.

A signal-handling apparatus as thus far described would still suffer from most or all of the disadvantages which have led the prior art away from this direct type of reflectance determination. It is at this point, however, that unique advantage is taken of two of the characteristics of the signals commonly found in optical scanning applications. In the first place, such signals are predominantly at the white level referred to above, with only relatively brief excursions to the black level, since the greater part of the document being scanned is of a background or white color. These two levels, of course, represent ranges of values rather than single magnitudes, and their specific color designations are arbitrary. Both levels are subject to noise and drift, and the two ranges may even overlap each other. In the second place, it is usually necessary, for reasons independent of the present invention, to provide a digitized video output, as at terminal 109, to provide a strong differentiation between the white and black levels. Given either or both of these characteristics, it becomes possible to design a level-control unit 300 which follows the varying white levels present on line 301, but which is relatively insensitive to the black levels thereon. A signal proportional to the varying white level may then be fed by a line 303 back to an input of differential amplifier 220 in order to compensate for the relatively low-frequency system drift and inaccuracies due to temperature differentials, aging, electrical mismatching, etc.

It is especially to be noted that drift in the PMTs 106 and 107 and in the logarithmic converter 210 are compensated by the present method, even though these components are not included within the feedback loop of the level-control unit 300. In addition, the present invention is inherently capable of correcting a troublesome phenomenon called "baseline bow," which causes apparent variations in the overall gain of many scanning systems. Due to the geometry and relative dimensions of most practical scanners, an apparent intensity change is detected as the light spot moves across the field of interest. At a constant beam intensity, for instance, the output of PMT 106 or 107 will be proportional to the solid angle from the spot of light to the periphery of the relatively large PMT face, even when the PMT parameters remain constant. It is therefore a conventional practice to position the PMT faces so that baseline bow variations in one PMT will be compensated by similar variations in the other PMT. This objective may be achieved by placing the PMTs so that the solid angle from any generated spot on CRT 101 to the face of PMT 106 is approximately proportional to the solid angle from the image of that spot on document 105 to the face of PMT 107. But even a perfect tracking between the two PMTs cannot compensate for baseline bow with subtractive (or other conventional) monitoring methods, since baseline bow effects are multiplicative, rather than additive, factors in the output of each PMT. In the device described herein, however, the two multiplicative factors are divided, thereby being substantially cancelled out. Thus, an important byproduct of the present invention to improve the effectiveness of conventional baseline bow tracking without the necessity for separate electronic compensation circuits.

Specific circuits for accepting a white-level compensation signal and for developing such a signal will now be described in connection with FIGS. 2 and 3, respectively.

Logarithmic converter 210 is shown in FIG. 2 as a pair of forward-biased diodes D21 and D22, each connected in shunt across one of the input lines 201 and 202. The PN junctions of these diodes operate according to the familiar diode equation to produce logarithmic voltage representations of the input current signals.

Lines 204 and 203 proceed to the inverting and noninverting inputs of a differential transistor pair T21–T22. The emitters of these transistors are coupled to a current-control transistor T23, whose base receives the output of level-control unit 300 on line 303. In the usual differential-amplifier circuit, any voltage variation on line 303 would cause the gain of the amplifier to change. This is undesirable in the present application, however, since a gain change would cause the log quotient of the input signals to be multiplied by a variable factor, which is equivalent to raising the quotient to a variable exponent. The desired effect in the present application is that the voltage on line 303 be capable of varying the current level, or operating point, of the differential pair T21–T22 without changing its gain. That is, the amplifier output is a substantially linear function of the signals on the three input lines 203, 204 and 303. This end is achieved by the use of emitter resistors R21 and R22 whose values are substantially higher than the internal base-emitter resistances of the transistors T21 and T22. The control input 303 then changes the common-mode current of amplifier 220 (and hence its output voltage level) without materially affecting its gain. Resistor R23 sets the quiescent common-mode current to a desired value. The achievement of these effects may be understood more fully by reference to a standard work, such as RCA Linear Integrated Circuit Fundamentals (First Ed., 1966), pages 8–24. Other methods of level control without gain variation are also possible, such as, for instance, the use of a second differential amplifier (not shown) or the use of an additional input to the differential pair T21–T22; the circuit shown, however, is both simple and adequate for the present purposes. The output from the differential pair is taken from a collector resistor R24 and fed to the base of a level-changing transistor T24, whose bias voltage is obtained from the voltage divider R25–R26 and filter capacitor C21. The collector of T24 supplies the differential output signal directly to line 301 for use by the level-control unit 300. A virtual-ground output for video processor 108 is provided on line 205 by means of resistor R27.

In FIG. 3, the analog output signal on line 301 is compared with a nominal reference voltage in a transistor differential pair T31–T32 of level-control unit 300. A second differential pair T33–T34 accepts the output of the first differential pair and compares it against a fixed, negative bias voltage. Large excursions from this bias voltage are prevented by a bipolar diode clipper D33 connected to collector resistor R33. R34 is a conventional emitter-bias resistor for the second differential pair. Differential pairs T31–T32 and T33–T34 together act as a charging means for a storage capacitor C31. The use of two serially connected transistor pairs allows the charging means both to charge and to discharge storage capacitor C31, i.e., to force the voltage stored on C31 to follow variations in the analog signal on line 301. Resistors R32–R34, however, limit the charging and discharging currents so as to provide a low pass filtering action. If the filter has a corner or rolloff frequency lower than the minimum frequency of either input signal under normal operating conditions (or equivalently, substantially lower than the frequency response of amplifier 220), it prevents the brief black-level peaks from having a significant effect upon the voltage stored by C31. To prevent output loading on line 303 from affecting the voltage stored on C31, the level-control signal is taken from the output of a high-impedance composite emitter follower comprising transistors T35–T36 and resistors R36–R38.

The action of control unit 300 in following only white-level signals is enhanced by the use of an inhibiting signal from output 109 of video processor 108. In the circuit of FIG. 3, diode D31 conducts when a zero-voltage (i.e., white-level) signal appears on line 302. The lower end of R31 is then at a voltage sufficiently low to back-bias diode D32, causing transistor T37 to be cut off. In this state, control unit 300 operates as previously described. A positive (black-level) voltage, however, reverse-biases D31 and thereby causes D32 and T37 to conduct. Since T37 now appears as a short circuit between emitter-bias resistor R32 and ground, transistors T31 and T33 are cut off over the full range of their base voltages, and the output signal on line 301 then cannot affect the voltage stored on capacitor C31. The aforementioned high input impedance of the composite emitter follower causes C31 to retain a constant stored voltage until the charging means ceases to be disabled by the positive signal on line 302. In this way, the magnitude of the level-control signal is frozen whenever the analog output signal exceeds the instantaneous magnitude of the black-white threshold magnitude determined by processor 108.

Having described a preferred embodiment thereof, I claim as my invention:

1. A signal-handling apparatus, comprising:
conversion means for receiving first and second variable input signals and for converting said input signals to first and second logarithmic representations;

difference means responsive to said converting means for producing an output signal having a magnitude related to the difference between said logarithmic representations, and to a level-control signal; and level-control means for producing said level-control signal as a function of the difference between said representations.

2. The apparatus of claim 1, wherein said difference means comprises a differential amplifier having a gain which is substantially independent of the magnitude of said level-control signal.

3. The apparatus of claim 2, wherein said differential amplifier comprises:

first and second transistors each having a base coupled to said converting means and having an emitter;

a third transistor having a base coupled to said level-control means and having a collector and an emitter; and first and second resistors each coupled from the emitter of one of said first and second transistors to the collector of said third transistor, the values of said resistors being substantially greater than the internal base-emitter resistances of said first and second transistors.

4. The apparatus of claim 1, wherein said level-control means is further responsive to an inhibiting signal for freezing the magnitude of said level-control signal when the magnitude of said output signal bears of predetermined relationship to a threshold magnitude.

5. The apparatus of claim 4, wherein said level-control means comprises:

means for storing a voltage indicative of the magnitude of said level-control signal;

charging means responsive to said output signal for varying said stored voltage; and means responsive to said inhibiting signal for disabling said charging means.

6. The apparatus of claim 5, wherein said storage means and said charging means together comprise a capacitive low-pass filter having a frequency-response characteristic lower than that of said difference means.

7. The apparatus of claim 1 wherein said converting means comprises a pair of forward-biased diodes connected in shunt across said receiving means.

8. The apparatus of claim 1 wherein said first input signal is responsive to the intensity of a radiant-energy source, and wherein said second input signal is responsive to the intensity of radiant energy reflected from an object illuminated by said source.

9. A signal-handling apparatus for a pair of variable input signals, comprising:

means for producing a pair of signals proportional to the logarithms of respective ones of said input signals;

amplifying means responsive to said logarithmic signals for producing a signal related to the quotient of said input signals; and feedback means responsive to said quotient signal for varying the operating point of said amplifying means without substantially changing its gain.

10. The apparatus of claim 9, further comprising:

means responsive to said amplifying means for digitizing said quotient signal into a plurality of magnitudes; and means responsive to said digitizing means for inhibiting said feedback means when said digitized signal has a predetermined one of said magnitudes.

11. The apparatus of claim 10 wherein said feedback means comprises a low-pass filter having a corner frequency lower than the minimum frequency of either of the said input signals.

12. The apparatus of claim 10, further comprising:

means for generating a deflectable beam of radiant energy;

a first photodetector directed toward said generating means for producing a first of said output signals in response to the intensity of said beam;

means for transmitting said beam to a reflective object; and a second photodetector directed toward said object for producing a second of said output signals in response to the intensity of reflections of said beam from said object.

13. A signal-handling apparatus for an optical scanner having means for generating a movable light beam and means for imaging said beam on a document to be scanned so as to cause reflections from said document, said apparatus comprising:

a first detector disposed with respect to said generating means so as to develop a first signal indicative of the intensity of said light beam;

a second detector disposed with respect to said document so as to develop a second signal indicative of the intensity of said reflections;

division means responsive to said detectors for producing a third signal related to the quotient of said first and second signals;

thresholding means responsive to said division means for producing a substantially discontinuous fourth signal from said third signal; and control means responsive to said division means and to said thresholding means for varying the magnitude of said third signal when said fourth signal has a first value, and for inhibiting said variation when said fourth signal has a second value.

14. The apparatus of claim 13, wherein said division means comprises:

means responsive to said detectors for converting said first and second signals to logarithmic representations; and an amplifier having first and second inputs for accepting said representations and a third input for accepting a fifth signal from said control means, said amplifier being adapted to produce said third signal as a substantially linear function of said representations and of said fifth signal.

15. The apparatus of claim 14, wherein said control means comprises:

capacitive means for storing a voltage representative of said fifth signal;

charging means responsive to said third signal for varying said stored voltage; and inhibiting means responsive to said second value of said fourth signal for preventing variation of said stored voltage in response to said third signal.

16. The apparatus of claim 2, wherein said level-control means is further responsive to an inhibiting signal for freezing the magnitude of said level-control signal when the magnitude of said output signal bears a predetermined relationship to a threshold magnitude.

17. The apparatus of claim 16, wherein said level-control means comprises:

means for storing a voltage indicative of the magnitude of said level-control signal;

charging means responsive to said output signal for varying said stored voltage; and means responsive to said inhibiting signal for disabling said charging means.

18. The apparatus of claim 17, wherein said storage means and said charging means together comprise a capacitive low-pass filter having a frequency-response characteristic lower than that of said difference means.

19. The apparatus of claim 2 wherein said converting means comprises a pair of forward-biased diodes connected in shunt across said receiving means.

* * * * *